April 29, 1941.  R. E. HORGER  2,239,891
LOCOMOTIVE ROD BEARING
Filed Jan. 20, 1940  2 Sheets-Sheet 2
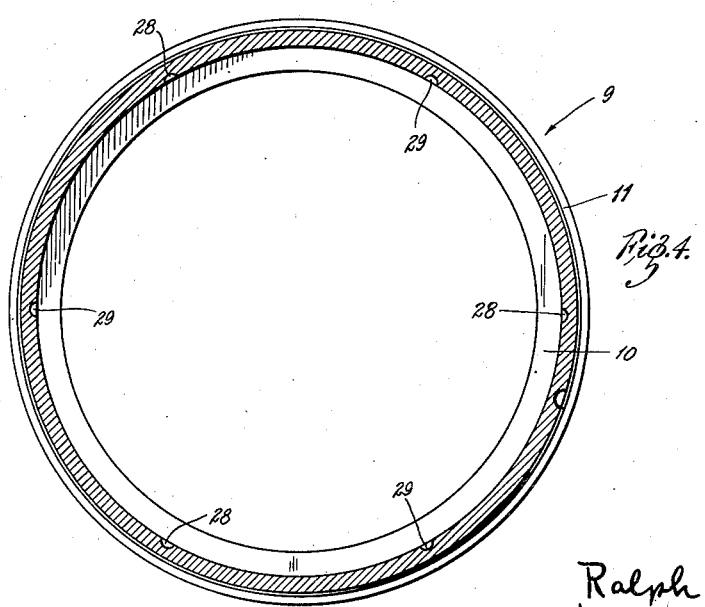
INVENTOR:
Ralph E. Horger,
by Carr Carr & Gravely
HIS ATTORNEYS.

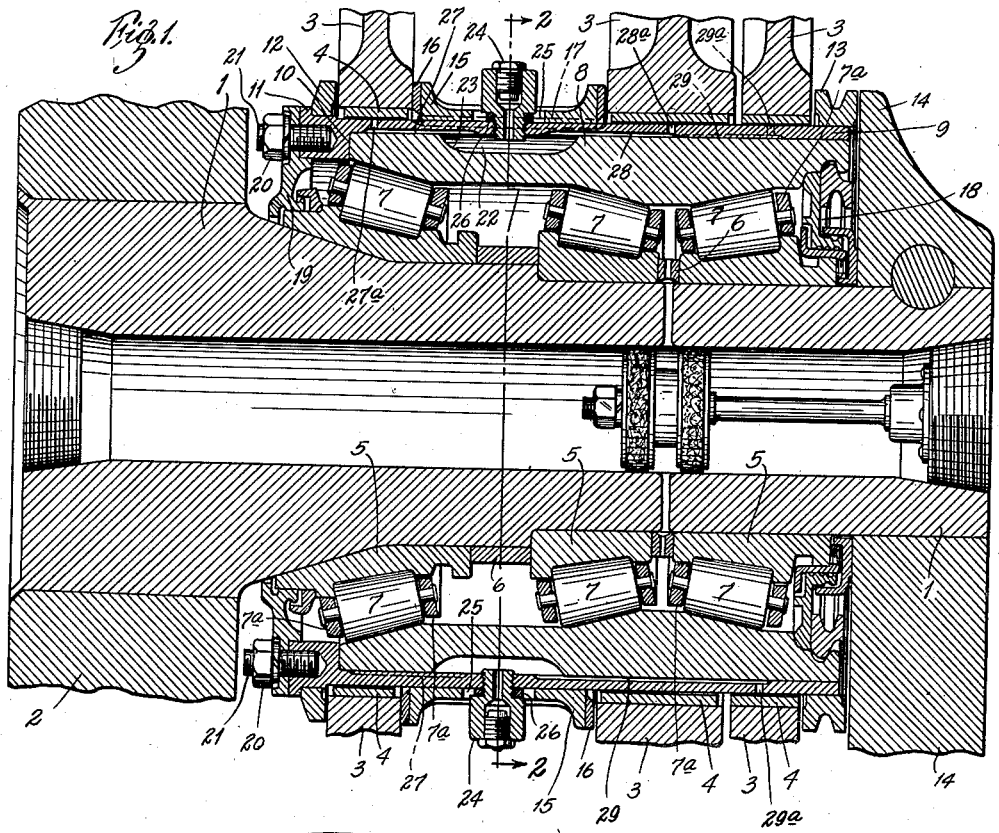

Patented Apr. 29, 1941

2,239,891

UNITED STATES PATENT OFFICE 2,239,891

LOCOMOTIVE ROD BEARING

Ralph E. Horger, Canton, Ohio, assignor to The Timken Roller Bearing Company, Canton, Ohio, a corporation of Ohio Application January 20, 1940, Serial No. 314,775

13 Claims. (Cl. 308—78)

This invention relates to roller bearing constructions, particularly roller bearing constructions for the drive rods of locomotives wherein the outer raceway member of the bearing functions as a journal for the rod bushings. The invention has for its principal objects to relieve the outer raceway member of the bearing of its function as a journal for the rod bushings and thus increase the life of said outer raceway member, to provide the bearing with a self-containing lubricating system for the rod bushings and journal, to provide readily accessible means for supplying said system with lubricant and to obtain other advantages hereinafter appearing. The invention consists in providing the outer raceway member of the bearing with a sleeve that constitutes a journal for the rod bushings and cooperates with said member to form a reservoir for lubricant and passageways for conveying the lubricant from said reservoir to the respective rod bushings. The invention also consists in the parts and in the arrangements and combinations of parts hereinafter described and claimed.

In the accompanying drawings, which form part of this specification and wherein like symbols refer to like parts wherever they occur.

Fig. 1 is a central horizontal section through a locomotive rod bearing construction embodying my invention, Fig. 2 is a cross-section on the line 2—2 in Fig. 1, Fig. 3 is a central longitudinal section through the replaceable journal sleeve for said bearing; and Fig. 4 is a transverse section through said sleeve on the line 4—4 in Fig. 3.

In the accompanying drawings, my invention is shown embodied in a locomotive rod bearing construction comprising a taper roller bearing mounted on the crank pin 1 of a driving wheel 2, one or more drive rods 3 and bronze bearing bushings 4 that are press-fitted in holes provided therefor in said rods and are rotatably supported on said roller bearing. Said roller bearing preferably comprises one or more cones or inner raceway members 5 that are press-fitted on the crank pin 1 and are spaced apart lengthwise thereof by spacing sleeves 6. Circular series or rows of tapered rollers 7, with suitable retaining cages 7a therefor, are provided for the respective cones 5; and the conical outer raceways for the respective series of rollers are formed in a single cup or outer raceway member 8. Press-fitted or shrunk on or otherwise rigidly secured to the outer raceway member 8 is a replaceable steel sleeve 9 having a hardened outer surface that constitutes a journal for the bearing bushing 4 of each of the drive rods 3.

The journal sleeve 9 terminates flush with the outer end of the outer raceway member 8 of the bearing and preferably extends beyond the inner end of said member and is formed with an internal annular shoulder 10 that abuts thereagainst. Sleeved on the journal sleeve between an annular shoulder 11 at the inner end thereof and the innermost drive rod is an abutment ring 12. A rod abutment ring 13 is also sleeved on said journal sleeve between the outermost drive rod and the eccentric crank 14 of the locomotive valve gear (not shown), said crank being pinned on the outer end of the crank pin and serving to retain said abutment ring on said journal sleeve and the bearing on said crank pin. A spacing sleeve 15 is mounted on the journal sleeve 9 of the roller bearing between the innermost and intermediate drive rods and has bronze wear rings 16 welded to its opposite ends, relative rotary movement of said spacing sleeve and journal sleeve being prevented by means of a cylindrical key 17 that fits in mating longitudinally disposed semi-cylindrical grooves in the respective sleeves. The annular space between the inner and outer raceway members of the roller bearing is closed at the outer end thereof by a suitable end closure 18 mounted in said outer member and at the inner end of said bearing by a suitable end closure 19 that is removably secured flatwise to the inner end of the journal sleeve 9 preferably by means of nuts 20 threaded on studs 21 that pass through holes in said last mentioned end closure and are screwed into threaded holes provided therefor in said end of said journal sleeve.

The roller bearing is provided opposite the rod spacing sleeve 15 with an annular reservoir 22 for lubricant, such reservoir being preferably formed between the journal sleeve 9 and the outer raceway member 8 of the bearing by an annular groove 23 formed in the outer periphery of said outer raceway member. This annular reservoir is supplied with lubricant through either of two suitable pressure feed fittings 24 having reduced inner ends threaded into diametrically opposed holes provided in the journal sleeve 9. These fittings are located between the inner and intermediate drive rods, the spacing sleeve 15 having radial holes 25 therein for said fittings that register with the threaded holes in the journal sleeve. Suitable lock washers 26 are sleeved on the reduced inner ends of the fittings 24 interposed between the shoulders formed thereby and flat seats on the outer surface of the journal sleeve.

Lubricant is conveyed from the annular lubricant reservoir 22 of the bearing to the cooperating surfaces of the journal sleeve 9 and the respective inner, intermediate and outer rod end bushings 4 journaled thereon through separate series of circumferentially spaced longitudinal grooves 27, 28 and 29 formed in the inner periphery of said sleeve, there being three equally spaced grooves in each series. The supply grooves or passageways 27 for the inner rod bushing lead from the annular reservoir 22 to radial discharge holes 27a that extend through the walls of the journal sleeve substantially midway of the ends of said bushing; the grooves 28 leading to the intermediate rod bushing communicate at one end with said reservoir and at the other end with radial holes 28a in said journal sleeve opposite said intermediate rod bushing; and the grooves 29 extending between the feed grooves 28 for said intermediate rod bushing from said reservoir to radial holes 29a that open through the outer periphery of said journal sleeve opposite the outer rod bushing.

The hereinbefore described bearing construction has numerous advantages. The outer raceway member is protected and strengthened by the steel sleeve thereon which constitutes the journal for the rod end bushings and thus entirely relieves the outer surface of said member of wear and eliminates the necessity for regrinding such surface. The steel journal sleeve is preferably press-fitted on the outer raceway member and its outside surface may be ground after said sleeve is mounted on said raceway member. When the sleeve becomes worn, or damaged, it may be removed by pulling or splitting and replaced with a new sleeve. Thus, there is no outside wear on the outer raceway member and replacement of the journal sleeve and rod bushings is easily accomplished. The journal sleeve also cooperates with the outer raceway member to form a simple and efficient self-contained lubricating system that requires no longitudinal grooving of the outside surface of said member, which grooving adds to the difficulty and expense of grinding such surface. The arrangement also provides a "one shot" lubricating system and thus makes it easy for the engineman to lubricate the rod bearings during a station stop.

Obviously, the hereinbefore described invention admits of considerable modification and I do not wish to be limited to the precise construction shown and described.

What I claim is:

1. A locomotive rod bearing construction comprising relatively rotatable inner and outer raceway members, a support for said inner raceway member, a separate journal sleeve rigidly mounted on said outer raceway member, a drive rod having a bearing rotatable on said journal sleeve, said outer raceway member and said journal sleeve cooperating to form a lubricant reservoir and passageways leading from said reservoir to the cooperating surfaces of said journal sleeve and said rod bearing.

2. A locomotive rod bearing construction comprising inner and outer raceway members, a crank pin for supporting said inner raceway member, a journal sleeve press-fitted on said outer raceway member, a drive rod having a bearing bushing rotatably supported on said journal sleeve, and end closures for the annular space between said raceway members, one of said end closures being rigid with one end of said journal sleeve.

3. A locomotive rod bearing construction comprising inner and outer raceway members, a pin supporting said inner raceway member, a separate sleeve mounted on and rigid with said outer raceway member, a drive rod rotatable on said sleeve, and end closures for the annular space between said raceway members, said journal sleeve extending beyond said outer raceway member at one end thereof and having a shoulder abutting against said end, one of said end closures being removably secured to the extended end of said journal sleeve.

4. A locomotive rod bearing construction comprising inner and outer raceway members, a pin supporting said inner raceway member, a separate journal sleeve mounted on and rigid with said outer raceway member, and a drive rod rotatable on said sleeve, said outer raceway member and said journal sleeve cooperating to form an annular lubricant reservoir therebetween and supply passageways leading from said reservoir and opening through the outer surface of said journal sleeve opposite said rod.

5. A locomotive rod bearing construction comprising inner and outer raceway members, a pin supporting said inner raceway member, a separate journal sleeve press-fitted on said outer raceway member, a drive rod rotatable on said journal sleeve, said outer raceway member and said sleeve cooperating to form an annular lubricant reservoir therebetween and supply passageways leading from said reservoir and opening through the outer peripheral surface of said sleeve opposite said rod, and means mounted on said journal sleeve for supplying lubricant to said annular reservoir.

6. A locomotive rod bearing construction comprising inner and outer raceway members, a pin supporting said inner raceway member, a separate journal sleeve press-fitted on said outer raceway member, and a drive rod having a bearing bushing rotatable on said journal sleeve, said outer raceway member having an annular groove in the outer peripheral surface thereof that cooperates with said journal sleeve to form an annular lubricant reservoir, said sleeve having openings extending therethrough opposite said bearing bushing and grooves in its inner periphery leading from said reservoir to said openings.

7. A locomotive rod bearing construction comprising inner and outer raceway members, a crank pin supporting said inner raceway member, a journal sleeve press-fitted on said outer raceway member, and a plurality of drive rods having bearing bushings therein journaled on said sleeve, said outer raceway member having an external annular groove therein that cooperates with said journal sleeve to form therewith an annular lubricant reservoir, said sleeve having openings extending therethrough opposite the respective bushings journaled thereon and grooves formed in the inner periphery of said journal sleeve and establishing communication between said reservoir and the respective openings in said sleeve.

8. A locomotive rod bearing construction comprising relatively rotatable inner and outer raceway members, a crank pin supporting said inner raceway member, a journal sleeve press-fitted on said outer raceway member, a plurality of drive rods having bearing bushings therein journaled on said journal sleeve, a spacing sleeve non-rotatably mounted on said journal sleeve between two adjacent drive rods, said outer raceway member having an external annular groove therein opposite said spacing sleeve that cooperates with said journal sleeve to form therewith an annular lubricant reservoir, said journal sleeve having separate series of circumferentially spaced openings extending therethrough opposite the respective bushings journaled thereon and separate series of circumferentially spaced longitudinal grooves formed in the inner periphery of said journal sleeve and establishing communication between said reservoir and the respective series of opening in said journal sleeve, and pressure feed fittings extending through registering openings provided therefor in said spacing sleeve and said journal sleeve and communicating with said reservoir.

9. A roller bearing comprising inner and outer raceway members, and a separate journal sleeve mounted on and rotatable with said outer raceway member and cooperating therewith to form a lubricant reservoir and passageway leading from said reservoir to the outer peripheral surface of said journal sleeve.

10. A roller bearing comprising inner and outer raceway members, a separate sleeve press-fitted on said outer raceway member, and end closures for the annular space between said inner and outer raceway members, said journal sleeve extending beyond the outer raceway members at one end thereof and having a shoulder abutting against said end, one of said end closures being removably secured to the extended end of said journal sleeve.

11. A roller bearing comprising inner and outer raceway members, and a separate journal sleeve mounted on and rigid with said outer raceway member, said outer raceway member and said journal sleeve cooperating to form an annular lubricant reservoir therebetween and supply passageways leading from said reservoir and opening through the outer surface of said journal sleeve.

12. A roller bearing comprising inner and outer raceway members, and a separate journal sleeve mounted on and rigid with said outer raceway member, said outer raceway member having an annular groove in the outer surface thereof that cooperates with said sleeve to form an annular lubricant reservoir, said sleeve having openings extending therethrough and grooves in its inner periphery leading from said reservoir to said openings.

13. A roller bearing comprising inner and outer raceway members, a journal sleeve press-fitted on said outer raceway member, said outer raceway member having an external annular groove therein that cooperates with said journal sleeve to form therewith an annular lubricant reservoir, said journal sleeve having separate series of circumferentially spaced radial openings extending therethrough and separate series of circumferentially spaced longitudinal grooves formed in the inner periphery of said journal sleeve and establishing communication between said reservoir and the respective series of radial openings in said journal sleeve, and a pressure feed fitting mounted on said journal sleeve in communication with said reservoir.

RALPH E. HORGER.